(12) United States Patent
Chae et al.

(10) Patent No.: US 7,620,117 B2
(45) Date of Patent: Nov. 17, 2009

(54) APPARATUS AND METHOD FOR ENCODING/DECODING SPACE TIME BLOCK CODE IN A MOBILE COMMUNICATION SYSTEM USING MULTIPLE INPUT MULTIPLE OUTPUT SCHEME

(75) Inventors: Chan-Byoung Chae, Seoul (KR); Hong-Sil Jeong, Suwon-si (KR); Katz Marcos Daniel, Suwon-si (KR); Dong-Seek Park, Yongin-si (KR); Young-Kwon Cho, Suwon-si (KR)

(73) Assignee: Samsung Electronics Co., Ltd (KR)

( * ) Notice: Subject to any disclaimer, the term of this patent is extended or adjusted under 35 U.S.C. 154(b) by 761 days.

(21) Appl. No.: 11/124,888

(22) Filed: May 9, 2005

(65) Prior Publication Data

US 2005/0249306 A1 Nov. 10, 2005

(30) Foreign Application Priority Data

May 7, 2004 (KR) ...................... 10-2004-0032411

(51) Int. Cl.
*H04L 27/00* (2006.01)

(52) U.S. Cl. ..................... 375/299; 375/267; 375/295; 375/347

(58) Field of Classification Search ................. 375/399, 375/267, 295, 347, 299
See application file for complete search history.

(56) References Cited

U.S. PATENT DOCUMENTS 6,134,215 A 10/2000 Agrawal et al.
7,190,734 B2 * 3/2007 Giannakis et al. ........... 375/267
7,292,647 B1 * 11/2007 Giannakis et al. ........... 375/295
7,508,880 B2 * 3/2009 Yun et al. .................... 375/267
2004/0013180 A1 1/2004 Giannakis et al.
2004/0067739 A1 4/2004 Sim et al.

FOREIGN PATENT DOCUMENTS

| CN | 1484899 | 3/2004 |
|----|---------|--------|
| RU | 2 142 202 | 11/1999 |
| RU | 2 145 152 | 1/2000 |

(Continued)

OTHER PUBLICATIONS

Tarokh et al., "Space-Time Block Codes from Orthogonal Designs", IEEE Transactions on Information Theory, vol. 45, No. 5, pp. 1456-1467, Jul. 1999.

(Continued)

*Primary Examiner*—Ted Wang
(74) *Attorney, Agent, or Firm*—The Farrell Law Firm, LLP

(57) ABSTRACT

Disclosed is an apparatus and method for encoding/decoding a space time block code in a mobile communication system using a multiple input multiple output scheme. In a transmitter employing a plurality of transmit antennas in the mobile communication system, if a signal to be transmitted is input, the transmit signal is pre-encoded according to a preset coding scheme, the pre-encoded signal is space-time mapped according to a number of the transmit antennas to employ a preset space time block coding scheme, and the space-time mapped signal is transmitted through the transmit antennas by applying the preset space time block coding scheme to the space-time mapped signal.

18 Claims, 8 Drawing Sheets

FOREIGN PATENT DOCUMENTS

WO      WO 03/056742      7/2003
WO      WO 2004/032370      4/2004

OTHER PUBLICATIONS

Siavash M. Alamouti, "A Simple Transmit Diversity Technique for Wireless Communications", IEEE Journal on Select Areas in Communications, vol. 16, No. 8, pp. 1451-1458, Oct. 1998.

Liu et al., "Space-Time Coding With Transmit Antennas for Multiple Access Regardless of Frequency-Selective Multipath", Sensory Array & Multichannel Signal Processing Workshop, Mar. 17, 2000.

Nir et al., "Efficient Diversity Techniques Using Linear Precoding and STBC for Multi-Carrier Systems", Sep. 19, 2003.

* cited by examiner

APPARATUS AND METHOD FOR ENCODING/DECODING SPACE TIME BLOCK CODE IN A MOBILE COMMUNICATION SYSTEM USING MULTIPLE INPUT MULTIPLE OUTPUT SCHEME

PRIORITY

This application claims priority under 35 U.S.C. § 119 to an application entitled "Apparatus and Method for Encoding/Decoding Space Time Block Code in Mobile Communication System Using Multiple Input Multiple Output Scheme" filed in the Korean Intellectual Property Office on May 7, 2004 and assigned Serial No. 2004-32411, the contents of which are incorporated herein by reference.

BACKGROUND OF THE INVENTION

1. Field of the Invention

The present invention relates to an apparatus and method for encoding/decoding a code, and more particularly to encoding/decoding a space time block code maximizing a diversity gain and a data transmission rate in a mobile communication system using a multiple input multiple output (MIMO) scheme.

2. Description of the Related Art

The primary concern of communication technology is how efficiently and reliably data can be transmitted through selected channels. In next generation multimedia mobile communication systems currently under development, it is essential to enhance system efficiency by employing suitable channel coding schemes for the systems according to high speed communication system requirements for providing various services based on wireless data beyond the basic voice communication.

However, differently from wired channels, wireless channel conditions in mobile Communication systems generate inevitable errors due to several factors such as multi-path interference, shadowing, propagation attenuation, time-varying noises, interference, and fading, thereby causing information loss.

The information loss causes serious distortion, which may degrade overall performance. Generally, to reduce this information loss, a variety of error-control techniques are employed according to channel characteristics, thereby improving reliability of the systems. The most basic scheme in these error-control techniques is a scheme of employing an error-correcting code.

In addition, a diversity scheme is employed to remove the instability of communication due to fading. The diversity scheme is classified into a time diversity scheme and a space diversity scheme such as a frequency diversity scheme or an antenna diversity scheme.

Herein, the antenna diversity scheme represents a scheme of employing multiple antennas divided into a receive antenna diversity scheme with a plurality of receive antennas, a transmit antenna diversity scheme with a plurality of transmit antennas, and a MIMO scheme with a plurality of receive antennas and a plurality of transmit antennas.

The MIMO scheme denotes a kind of a space time coding (STC) scheme which is a preset coding scheme through which coded signals are transmitted via plural transmit antennas, so that the coding in the time domain is expanded to the space domain, thereby achieving a lower error rate. A space time block coding (STBC) scheme (one of schemes suggested in order to efficiently employ the antenna diversity scheme) has been suggested by Vahid Tarokh (reference; Vahid Tarokh, "Space Time Block Coding From Orthogonal Design," Institute of Electrical and Electronics Engineers (IEEE) Trans. on Info., Theory, Vol. 45, pp. 1456-1467, July 1999). The space time block coding scheme is a scheme expanded such that a transmit antenna diversity suggested by S. M. Alamouti (reference; S. M. Alamouti, "A Simple Transmitter Diversity Scheme For Wireless Communications", IEEE Journal on Selected Area in Communications, Vol. 16, pp. 1451-1458, October 1998 ) may be applied to at least two transmit antennas.

Hereinafter, a structure of a transmitter in a MIMO mobile communication system employing four transmit antennas (Tx.ANTs) and the STBC scheme suggested by Vahid Tarokh will be described with reference to FIG. 1.

FIG. 1 is a block diagram illustrating the structure of the transmitter in the MIMO mobile communication system using the four transmit antennas (Tx.ANTs) and the STBC scheme suggested by Vahid Tarokh.

The transmitter includes a modulator 100, a serial to parallel (S/P) converter 102, a space time block encoder 104, and four transmit antennas which are a first transmit antenna (Tx.ANT 1) 106 to a fourth transmit antenna (Tx. ANT 4) 112.

When information data bits are input to the modulator 100, the modulator 100 creates modulated symbols by modulating the input information data bits through a preset modulation scheme and then outputs the modulated symbols to the S/P converter 102. Herein, the modulation scheme may be one of a binary phase shift keying (BPSK) scheme, a quadrature phase shift keying (QPSK) scheme, a quadrature amplitude modulation (QAM) scheme, a pulse amplitude modulation (PAM) scheme, a phase shift keying (PSK) scheme, etc.

The S/P converter 102 receives the serial modulated symbols output from the modulator 100, converts the serial modulated symbols into parallel modulated symbols and then outputs the converted symbols to the space time block encoder 104. Herein, it is assumed that the serial modulated symbols output from the modulator 100 are '$s_1 s_2 s_3 s_4$'. The space time block encoder 104 outputs modulated symbols in Equation (1) by space time encoding four modulated symbols ($s_1, s_2, s_3, S_4$) received from the S/P converter 102:

$$G_4 = \begin{bmatrix} s_1 & s_2 & s_3 & s_4 \\ -s_2 & s_1 & -s_4 & s_3 \\ -s_3 & s_4 & s_1 & -s_2 \\ -s_4 & -s_3 & s_2 & s_1 \\ s_1^* & s_2^* & s_3^* & s_4^* \\ -s_2^* & s_1^* & -s_4^* & s_3^* \\ -s_3^* & s_4^* & s_1^* & -s_2^* \\ -s_4^* & -s_3^* & s_2^* & s_1^* \end{bmatrix} \quad (1)$$

In Equation (1), the $G_4$ denotes a coding matrix for symbols transmitted through four transmit antennas. In the matrix of Equation (1), each element of each row corresponds to time slot, and each element of each column corresponds to each transmit antenna at a corresponding time slot.

That is, at a first time slot, the symbols $s_1, s_2, s_3$, and $s_4$ are transmitted through the first transmit antenna 106 to the fourth transmit antenna 112, respectively. Similarly, at an eighth time slot, the symbols $-s_4^*, -s_3^*, s_2^*$, and $s_1^*$, are transmitted through the first transmit antenna 106 to the fourth transmit antenna 112, respectively.

As described with reference to Equation (1), the space time block encoder 104 controls input modulated symbols to be transmitted through the four transmit antennas at eight time slots by performing a negative operation and a conjugate operation with respect to the input modulated symbols. Herein, diversity gains corresponding to diversity orders can be acheived because the symbols transmitted through the four transmit antennas are orthogonal to each other.

The structure of the transmitter in the MIMO mobile communication system employing the four transmit antennas (Tx.ANTs) and the STBC scheme suggested by Vahid Tarokh is described with reference to FIG. 1. Hereinafter, a structure of a receiver corresponding to the structure of the transmitter shown in FIG. 1 will be described with reference to FIG. 2.

In FIG. 2, the receiver includes plural receive antennas (e.g., P number of receive antennas; a first receive antenna (Rx. ANT 1) 200 to a $P^{th}$ receive antenna (Rx. ANT P) 202, a channel estimator 204, a signal combiner 206, a detector 208, a parallel to serial (P/S) converter 210, and a de-modulator 212. Although it is assumed that the number of receive antennas in the receiver is different from the number of the transmit antennas in the transmitter corresponding to the receiver in FIG. 2, it is expected that the number of the receive antennas may be identical to the number of the transmit antennas.

As described with reference to FIG. 1, the signals transmitted through the four transmit antenna in the transmitter are received through the first receive antenna 200 to the $P^{th}$ receive antenna 202, respectively. Each of the first receive antenna 200 to the $P^{th}$ receive antenna 202 outputs each of the received signals to the channel estimator 204 and the signal combiner 206.

The channel estimator 204 receives the signals input through the first receive antenna 200 to the $P^{th}$ receive antenna 202, estimates channel coefficients representing channel gains, and outputs signals to the detector 208 and the signal combiner 206. The signal combiner 206 receives signals input through the first receive antenna 200 to the $P^{th}$ receive antenna 202 and signals output from the channel estimator 204, combines the signals in order to make receive symbols, and then outputs the receive symbols to the detector 208.

The detector 208 generates hypotheses symbols by multiplying the receive symbols output from the signal combiner 206 by the channel coefficients output from the channel estimator 204, calculates decision statistic with respect to all symbols transmittable in the transmitter using the hypotheses symbols, and detects modulated symbols transmitted in the transmitter through threshold detection so as to output the modulated symbols to the parallel/serial converter 210.

The P/S converter 210 receives and converts parallel modulated symbols output from the detector 208 into serial modulated symbols and then outputs the converted symbols to the de-modulator 212. The de-modulator 212 receives the serial modulated symbols output from the P/S converter 210 and recovers original information data bits by de-modulating the serial modulated symbols through a de-modulation scheme corresponding to a modulation scheme employed for the modulator 100 in the transmitter.

As described above, the space time block coding scheme suggested by S. M. Alamouti does not generate data rate loss and can provide the maximum diversity order identical to the number of the transmit antennas even when the transmitter transmits complex symbols through two transmit antennas.

The structures of both the transmitter and the receiver (described with reference to FIGS. 1 and 2) suggested by Vahid Tarokh through expansion of the space time block coding scheme suggested by S. M. Alamouti can provide the maximum diversity order using the space time block code in a type of a matrix having mutually-orthogonal columns. In addition, the structures of both the transmitter and the receiver described with reference to FIGS. 1 and 2 reduce a data rate by half because four complex symbols are transmitted at eight time slots. In addition, the structures degrade receive performance under a fast fading condition because eight time slots are required to transmit one signal block (i.e., four symbols).

When signals are transmitted through at least four transmit antennas based on the space time block coding scheme as described above, transmission of N symbols requires 2× n number of time slots, thereby increasing latency and generating data rate loss.

To design a scheme having a full rate in a multiple antenna communication system transmitting signals through at least three transmit antennas, the Giannakis group suggests a full diversity full rate (FDFR) STBC scheme using four transmit antennas based on constellation rotation in a complex field.

Hereinafter, a structure of a transmitter in a MIMO mobile communication system using four transmit antennas and the STBC scheme suggested by the Giannakis group will be described with reference to FIG. 3.

In FIG. 3, the transmitter includes a modulator 300, a pre-encoder 302, a space time mapper 304, and four transmit antennas (a first transmit antenna (Tx.ANT 1) 306 to a fourth transmit antenna (Tx. ANT 4) 312. If information data bits are input, the modulator 300 generates modulated symbols by modulating the information data bits based on a preset modulation scheme and then outputs the modulated symbols to the pre-encoder 302. Herein, the modulation scheme may be employed as one of a BPSK scheme, a QPSK scheme, a QAM scheme, a PAM scheme, and a PSK scheme.

The pre-encoder 302 receives the four modulated symbols (i.e., $d_1, d_2, d_3, d_4$) output from the modulator 300, encodes the symbols such that signal rotation may occur in a signal space, and outputs the encoded signals to the space time mapper 304. Herein, it is assumed that an input modulated symbol stream including the four modulated symbols output from the modulator 300 is referred to as 'd'. The pre-encoder 302 generates a complex vector 'r' by performing an operation of Equation (2) with respect to the input modulated symbol stream d and outputs the vector r to the space time mapper 304:

$$r = \Theta d = \begin{bmatrix} 1 & \alpha_0^1 & \alpha_0^2 & \alpha_0^3 \\ 1 & \alpha_1^1 & \alpha_1^2 & \alpha_1^3 \\ 1 & \alpha_2^1 & \alpha_2^2 & \alpha_2^3 \\ 1 & \alpha_3^1 & \alpha_3^2 & \alpha_3^3 \end{bmatrix} \begin{bmatrix} d_1 \\ d_2 \\ d_3 \\ d_4 \end{bmatrix} = \begin{bmatrix} r_1 \\ r_2 \\ r_3 \\ r_4 \end{bmatrix} \quad (2)$$

In Equation 2, the Θ denotes a pre-encoding matrix. The space time block coding scheme suggested by the Giannakis group employs a Vandermonde matrix (unitary matrix) as the pre-encoding matrix. In addition, the $\alpha_i$ in Equation (2) is expressed as Equation (3):

$\alpha_i = \exp(j2\pi(i+\frac{1}{4})/4), i=0,1,2,3$

. . . (3)The STBC scheme suggested by the Giannakis group is not only proper for the case of using four transmit antennas as described above but also can be easily applied to a case of using more than four transmit antennas. The space time mapper 304 receives and space-time encodes signals output from the pre-encoder 302 and then outputs the signals as modulated symbols in Equation (4):

$$S = \begin{bmatrix} r_1 & 0 & 0 & 0 \\ 0 & r_2 & 0 & 0 \\ 0 & 0 & r_3 & 0 \\ 0 & 0 & 0 & r_4 \end{bmatrix} \quad (4)$$

In Equation (4), the S denotes a coding matrix for symbols transmitted through four transmit antennas. In the matrix of Equation (4), each element of each row corresponds to time slot, and each element of each column corresponds to each transmit antenna at a corresponding time slot.

In other words, at a first time slot, the symbol $r_1$ is transmitted through a first transmit antenna 306, and no signal is transmitted through remaining transmit antennas (i.e., a second transmit antenna 308 to a fourth transmit antenna 312). Similarly, at a fourth time slot, the symbol $r_4$ is transmitted through the fourth transmit antenna 312 and no signal is transmitted through remaining transmit antennas (i.e., the first transmit antenna 308 to the third transmit antenna 310).

The symbols in Equation (4) are received in a receiver (not shown) through a wireless channel. The receiver recovers the modulated symbol stream d through a maximum likelihood (ML) decoding scheme. As a result, the receiver recovers information data bits.

The Tae Jin Jeong and Gyung Hoon Jeon research team suggested a concatenated code and a pre-encoder having a coding gain superior to that of the space time block coding scheme suggested by the Giannakis group in 2003. The Tae Jin Jeong and Gyung Hoon Jeon research team greatly improved by performing concatenation with respect to the space time block code suggested by S. M. Alamouti instead of using a diagonal matrix suggested by the Giannakis group.

Hereinafter, a structure of a transmitter in a MIMO mobile communication system using four transmit antennas and a STBC scheme suggested by the Tae Jin Jeong and Gyung Hoon Jeon research team will be described with reference to FIG. 4.

FIG. 4 is a block diagram illustrating the structure of the transmitter in the MIMO mobile communication system using the four transmit antennas and the STBC scheme suggested by the Tae Jin Jeong and Gyung Hoon Jeon research team.

The transmitter includes a pre-encoder 400, a mapper 402, a delay unit 404, Alamouti encoders 406 and 408, and a first transmit antenna (Tx.ANT 1) 410 to a fourth transmit antenna (Tx.ANT 4) 416. If information data bits are input, the pre-encoder 400 receives four modulated symbols, encodes the modulated symbols such that signal rotation may occur in a signal space, and then outputs the encoded symbols to the mapper 402. Herein, it is assumed that an input modulated symbol stream including the four modulated symbols is referred to as 'd'. The pre-encoder 400 receives the input modulated symbol stream d and can pre-encode the input modulated symbol stream d as shown in Equation (5):

$$r = \Theta d = \begin{bmatrix} 1 & \alpha_0^1 & \alpha_0^2 & \alpha_0^3 \\ 1 & \alpha_1^1 & \alpha_1^2 & \alpha_1^3 \\ 1 & \alpha_2^1 & \alpha_2^2 & \alpha_2^3 \\ 1 & \alpha_3^1 & \alpha_3^2 & \alpha_3^3 \end{bmatrix} \begin{bmatrix} d_1 \\ d_2 \\ d_3 \\ d_4 \end{bmatrix} = \begin{bmatrix} r_1 \\ r_2 \\ r_3 \\ r_4 \end{bmatrix} \quad (5)$$

In Equation (5), the $\alpha_i$ is equal to '$\alpha_i = \exp(j2\pi(i+\frac{1}{4})/4)$, i=0, 1, 2, 3'. The mapper 402 receives signals output from the pre-encoder 400 and outputs vectors formed based on two elements ($[r_1,r_2]$, $[r_3,r_4]$). In other words, the mapper 402 outputs ($[r_1,r_2]^T$) and ($[r_3,r_4]^T$).

The ($[r_1,r_2]^T$) is input to the Alamouti encoder 406, and the ($[r_3,r_4]^T$) is input to the delay unit 404. The delay unit 404 delays the ($[r_3,r_4]^T$) by one time duration and then outputs the delayed ($[r_3,r_4]^T$) to the Alamouti encoder 408. Herein, the Alamouti encoder represents an encoder employing the space time block coding scheme suggested by S. M. Alamouti.

The Alamouti encoder 406 controls the ($[r_1,r_2]^T$) output from the mapper 402 to be transmitted through the first transmit antenna 410 and the second transmit antenna 412 at a first time slot. The Alamouti encoder 408 controls the ($[r_1,r_2]^T$) output from the mapper 402 to be transmitted through the third transmit antenna 414 and the fourth transmit antenna 416 at a second time slot. A coding matrix used for transmitting output signals of the Alamouti encoders 406 and 408 through multiple antennas is expressed as Equation (6):

$$S = \begin{bmatrix} r_1 & r_2 & 0 & 0 \\ -r_2^* & r_1^* & 0 & 0 \\ 0 & 0 & r_3 & r_4 \\ 0 & 0 & -r_4^* & r_3^* \end{bmatrix} \quad (6)$$

The coding matrix shown in Equation (6) differs from the coding matrix shown in Equation (4) in that the coding matrix shown in Equation (6) is not a diagonal matrix, but is realized through an Alamouti scheme. The space time block coding scheme suggested by the Tae Jin Jeong and Gyung Hoon Jeon research team increases a coding gain as compared with that of the space time block coding scheme suggested by the Giannakis group by employing a transmission type based on the Alamouti scheme.

However, when the space time block coding scheme suggested by the Tae Jin Jeong and Gyung Hoon Jeon research team is employed, a receiver must perform an operation with respect to all possible elements output from a pre-encoder to recover information data bits transmitted in the transmitter. For example, when the number of transmit antennas is four, the operation must be performed with respect to all 16 elements and there are no elements having the value of zero. That is, in the receiver, loads due to a computation amount increase because the information data bits transmitted in the transmitter are recovered through the ML decoding scheme.

Accordingly, it is desirable to provide an apparatus and method for space time block coding, that minimizes complexity and computation with full diversity full rate.

SUMMARY OF THE INVENTION

Accordingly, the present invention has been made to solve the above-mentioned problems occurring in the prior art, and an object of the present invention is to provide an apparatus and method for decoding/encoding a space time block code having full diversity full rate in a MIMO mobile communication system.

Another object of the present invention is to provide an apparatus and method for decoding/encoding a space time block code while minimizing complexity and a computation amount in a MIMO mobile communication system.

To accomplish the above objects, there is provided an apparatus for encoding a space time block code in a transmitter employing a plurality of transmit antennas, the apparatus including a pre-encoder for, if a signal to be transmitted is input, pre-encoding the transmit signal according to a preset coding scheme, a space-time mapper for space-time mapping the pre-encoded signal according to a number of transmit antennas to employ a preset space time block coding scheme, and a plurality of encoders for transmitting the space-time mapped signal through the transmit antennas by applying the preset space time block coding scheme to the space-time mapped signal.

According to another aspect of the present invention, there is provided an apparatus for coding a space time block code in a transmitter employing four transmit antennas including a first transmit antenna, a second transmit antenna, a third transmit antenna, and a fourth transmit antenna, the apparatus including a pre-encoder for, if a symbol stream '$d_1\ d_2\ d_3\ d_4$' to be transmitted is input, pre-encoding the input symbol stream '$d_1\ d_2\ d_3\ d_4$' according to a preset pre-encoding matrix so as to generate a pre-encoded symbol stream '$r_1\ r_2\ r_3\ r_4$', a mapper for space-time mapping the pre-encoded symbol stream '$r_1\ r_2\ r_3\ r_4$' to employ a preset space time block coding scheme to generate space-time mapped symbol streams '$r_1\ r_2$' and '$r_3\ r_4$', and two encodes for transmitting the space-time symbol streams '$r_1\ r_2$' and '$r_3\ r_4$' through the transmit antennas by applying the preset space time block coding scheme to the space-time mapped symbol stream '$r_1\ r_2$' and '$r_3\ r_4$'.

According to another aspect of the present invention, there is provided an apparatus for coding a space time block code in a receiver employing at least one receive antenna, the space time block code being transmitted through a plurality of transmit antennas by using a preset pre-encoding matrix in a transmitter, the apparatus including a channel response matrix generator for, if signals are received through the receive antennas, generating a channel response matrix by performing channel estimation with respect to the received signals, a signal combiner for combining the received signals in consideration of the channel response matrix, and a plurality of signal determination units for recovering the space time block code transmitted in the transmitter as information symbols based on the combined signals in consideration of the channel response matrix.

According to another aspect of the present invention, there is provided a method for encoding a space time block code in a transmitter employing a plurality of transmit antennas, the method including the steps of, if a signal to be transmitted is input, pre-encoding the transmit signal according to a preset coding scheme, space-time mapping the pre-encoded signal according to a number of transmit antennas to employ a preset space time block coding scheme, and transmitting the space-time mapped signal through the transmit antennas by applying the preset space time block coding scheme to the space-time mapped signal.

According to another aspect of the present invention, there is provided a method for encoding a space time block code in a transmitter employing four transmit antennas including a first transmit antenna, a second transmit antenna, a third transmit antenna, and a fourth transmit antenna, the method including the steps of, if an input symbol stream '$d_1\ d_2\ d_3\ d_4$' to be transmitted is input, pre-encoding the input symbol stream '$d_1\ d_2\ d_3\ d_4$' according to a preset pre-encoding matrix to generate a pre-encoded symbol stream '$r_1\ r_2\ r_3\ r_4$', space-time mapping the pre-encoded symbol stream '$r_1\ r_2\ r_3\ r_4$' in order to employ a preset space time block coding scheme to generate space-time mapped symbol streams '$r_1\ r_2$' and '$r_3\ r_4$', and transmitting the space-time mapped symbol streams '$r_1\ r_2$' and '$r_3\ r_4$' through the transmit antennas by applying the preset space time block coding scheme to the space-time mapped symbol streams '$r_1\ r_2$' and '$r_3\ r_4$'.

According to another aspect of the present invention, there is provided a method for decoding a space time block code in a receiver employing at least one receive antenna, the space time block code being transmitted through a plurality of transmit antennas by using a preset pre-encoding matrix in a transmitter, the method including the steps of, if signals are received through the receive antennas, generating a channel response matrix by performing channel estimation with respect to the received signals, combining the received signals in consideration of the channel response matrix, and recovering the space time block code transmitted in the transmitter as information symbols based on the combined signals in consideration of the channel response matrix.

BRIEF DESCRIPTION OF THE DRAWINGS

The above and other objects, features and advantages of the present invention will be more apparent from the following detailed description taken in conjunction with the accompanying drawings, in which.

DETAILED DESCRIPTION OF THE PREFERRED EMBODIMENT

Figure 1:
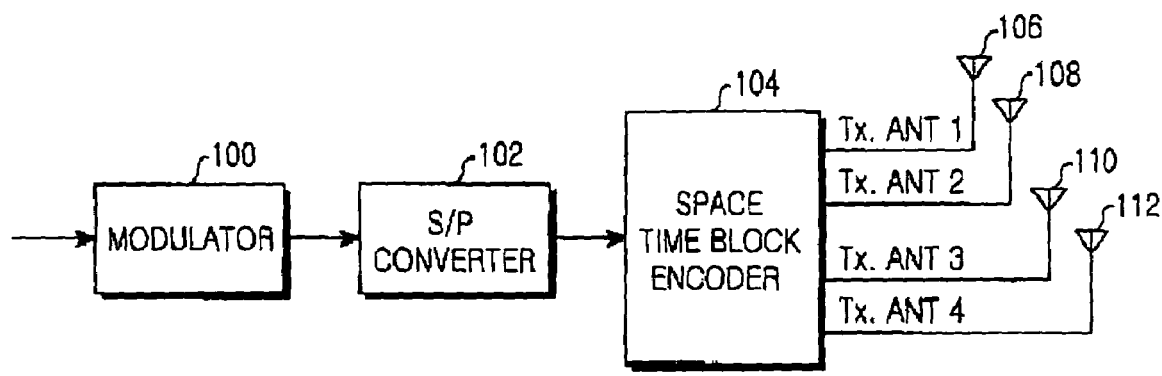
FIG. 1 is a block diagram illustrating a structure of a transmitter in a MIMO mobile communication system employing 4-Tx. ANTSs and a STBC scheme suggested by Vahid Tarokh.
Figure 2:
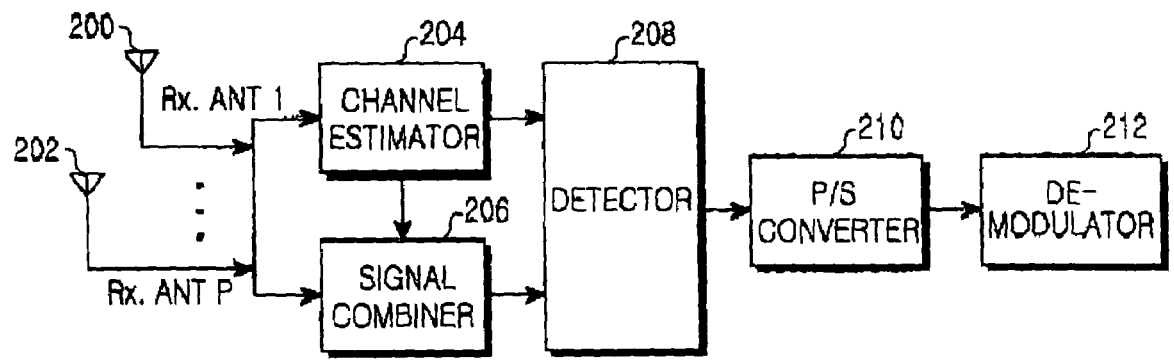
FIG. 2 is a block diagram illustrating a structure of a receiver corresponding to the structure of the transmitter shown in FIG. 1.
Figure 3:
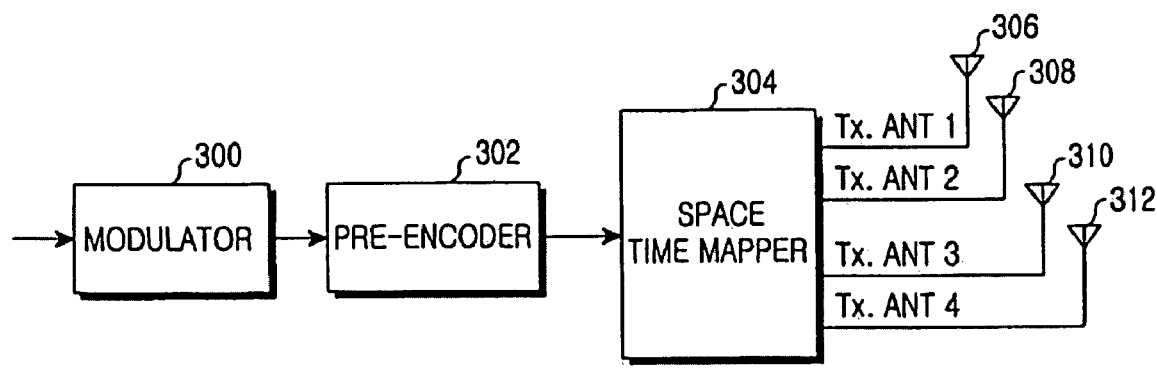
FIG. 3 is a block diagram illustrating a structure of a transmitter in a MIMO mobile communication system employing 4-Tx. ANTSs and a STBC scheme suggested by the Giannakis group.

Hereinafter, a preferred embodiment of the present invention will be described in detail with reference to the accompanying drawings. Note that the same or similar components in drawings are designated by the same reference numerals as far as possible although they are shown in different drawings.

In the following description of the present invention, a detailed description of known functions and configurations incorporated herein will be omitted when it may make the subject matter of the present invention unclear.

The present invention proposes a space time block coding scheme having full diversity full rate (FDFR) in a mobile communication system using a multiple input multiple output (MIMO) scheme. In particular, the present invention proposes an apparatus and method for space time block encoding/decoding that minimizes complexity and a computation amount with the FDFR.

Figure 5:
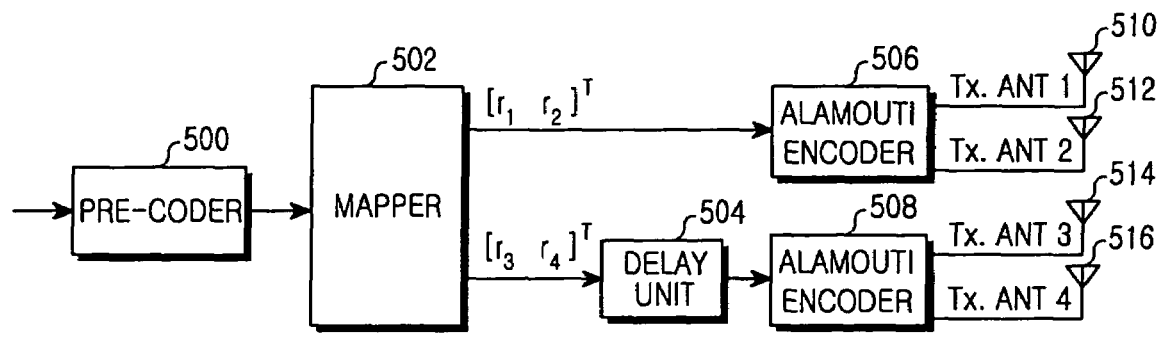
FIG. 5 is a block diagram illustrating a structure of a transmitter in a MIMO mobile communication system employing 4-Tx. ANTSs and a STBC scheme for performing functions according to an embodiment of the present invention.

FIG. 5 is a block diagram illustrating a structure of a transmitter in the MIMO mobile communication system employing four transmit antennas and the space time block coding scheme for performing functions according to an embodiment of the present invention.

Prior to a detailed description of FIG. 5, the structure of the transmitter in the MIMO mobile communication system employing the four transmit antennas and the space time block coding scheme suggested according to an embodiment of the present invention is generally described. The system is constructed in such a manner that complexity and a computation amount are minimized with a diversity gain and a data rate identical to those obtained through a structure of a transmitter in a MIMO mobile communication system employing four transmit antennas and the space time block coding scheme suggested by the Tae Jin Jeong and Gyung Hoon Jeon research team described in the conventional technique.

In other words, the transmitter according to an embodiment of the present invention has the same hardware structure as the transmitter in the MIMO mobile communication system suggested by the Tae Jin Jeong and Gyung Hoon Jeon research team. However, the present invention proposes a new operation of a pre-encoder, thereby minimizing complexity and a computation amount.

Referring to FIG. 5, the transmitter according to an embodiment of the present invention includes a pre-encoder 500, a mapper 502, a delay unit 504, Alamouti encoders 506 and 508, and a first transmit antenna (Tx.ANT 1) 510 to a fourth transmit antenna (Tx. ANT 4) 516. If information data bits are input, the pre-encoder 500 receives four modulated symbols, encodes the modulated symbols such that signal rotation may occur in a signal space, and then outputs the encoded symbols to the mapper 502.

Herein, it is assumed that the four modulated symbols input to the pre-encoder 500 are $d_1$, $d_2$, $d_3$, and $d_4$, and an input modulated symbol stream including the four modulated symbols is referred to as 'd'. The pre-encoder 500 receives the input modulated symbol stream d and generates a complex vector r by pre-encoding the input modulated symbol stream d based on a new pre-encoding matrix according to an embodiment of the present invention. Description about the new pre-encoding matrix will be given later.

Hereinafter, an operation based on a pre-encoding matrix suggested by the Tae Jin Jeong and Gyung Hoon Jeon research team will be described before the new pre-encoding matrix according to the an embodiment of the present invention.

Figure 4:
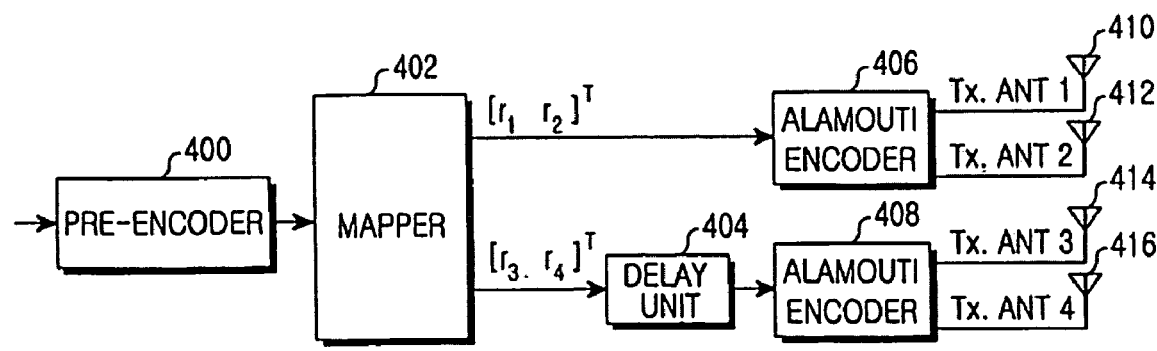
FIG. 4 is a block diagram illustrating a structure of a transmitter in a MIMO mobile communication system employing 4-Tx. ANTSs and a STBC scheme suggested by the Tae Jin Jeong and Gyung Hoon Jeon research team.

In the structure of the transmitter in the MIMO mobile communication system suggested by the Tae Jin Jeong and Gyung Hoon Jeon research team, the pre-encoder 400 generates a complex vector r by performing pre-encoding as shown in Equation (7) based on the Vandermonde matrix as described with reference to FIG. 4:

$$r = \Theta d = \begin{bmatrix} 1 & \alpha_0^1 & \alpha_0^2 & \alpha_0^3 \\ 1 & \alpha_1^1 & \alpha_1^2 & \alpha_1^3 \\ 1 & \alpha_2^1 & \alpha_2^2 & \alpha_2^3 \\ 1 & \alpha_3^1 & \alpha_3^2 & \alpha_3^3 \end{bmatrix} \begin{bmatrix} d_1 \\ d_2 \\ d_3 \\ d_4 \end{bmatrix} = \begin{bmatrix} r_1 \\ r_2 \\ r_3 \\ r_4 \end{bmatrix} \quad (7)$$

In Equation 7, $\Theta$ denotes the pre-encoding matrix. The space time block coding scheme suggested by the Tae Jin Jeong and Gyung Hoon Jeon research team employs the Vandermonde matrix (unitary matrix) as the pre-encoding matrix. In addition, the ac in Equation (7) is expressed as Equation (8):

$$\alpha_i = \exp(j2\pi(i+\frac{1}{4})/4), i=0,1,2,3 \quad (8)$$

The mapper 402 receives signals output from the pre-encoder 400 and outputs vectors formed based on two elements ($[r_1,r_2]$, $[r_3,r_4]$). In other words, the mapper 402 outputs ($[r_1, r_2]^T$) and ($[r_3, r_4]^T$).

The ($[r_1,r_2]^T$) is input to the Alamouti encoder 406, and the ($[r_3,r_4]^T$) is input to the delay unit 404. The delay unit 404 delays the ($[r_3, r_4]^T$) by one hour and then outputs the delayed ($[r_3,r_4]^T$) to the Alamouti encoder 408. Herein, the Alamouti encoder represents an encoder employing the space time block coding scheme suggested by S. M. Alamouti. The Alamouti encoder 406 controls the ($[r_1,r_2]^T$) output from the mapper 402 to be transmitted through the first transmit antenna 410 and the second transmit antenna 412 at a first time slot. The Alamouti encoder 408 controls the ($[r_1,r_2]^T$) output from the mapper 402 to be transmitted through the third transmit antenna 414 and the fourth transmit antenna 416 at a second time slot. A coding matrix S used for transmitting output signals of the Alamouti encoders 406 and 408 through multiple antennas is expressed in Equation (9):

$$S = \begin{bmatrix} r_1 & r_2 & 0 & 0 \\ -r_2^* & r_1^* & 0 & 0 \\ 0 & 0 & r_3^* & r_4^* \\ 0 & 0 & -r_4^* & r_3^* \end{bmatrix} \quad (9)$$

In Equation (9), an $i^{th}$ row of the coding matrix S is transmitted at an $i^{th}$ time slot, and a $j^{th}$ column is transmitted through a $j^{th}$ transmit antenna.

In other words, at a first time slot, the symbols $r_1$ and $r_2$ are transmitted through the first transmit antenna 410 and the second transmit antenna 412, respectively, and no signal is transmitted through remaining transmit antennas (i.e., the third transmit antenna 414 and the fourth transmit antenna 416). At a second time slot, the symbols $-r_2^*$ and $r_1^*$ are transmitted through the first transmit antenna 410 and the second transmit antenna 412, respectively, and no signal is transmitted through remaining transmit antennas (i.e., the third transmit antenna 414 and the fourth transmit antenna 416).

At a third time slot, the symbols $r_3^*$ and $r_4^*$ are transmitted through the third transmit antenna 414 and the fourth transmit antenna 416, respectively, and no signal is transmitted through remaining transmit antennas (i.e., the first transmit antenna 410 and the second transmit antenna 412). At a fourth time slot, the symbols $-r_4^*$ and $r_3^*$ are transmitted through the third transmit antenna 414 and the fourth transmit antenna 416, respectively, and no signal is transmitted through remaining transmit antennas (i.e., the first transmit antenna 410 and the second transmit antenna 412).

A receiver in the MIMO mobile communication system employing the scheme suggested by the Tae Jin Jeong and Gyung Hoon Jeon research team uses a vector like that of Equation (10):

$$y = \begin{bmatrix} y_1 \\ y_2^* \\ y_3 \\ y_4^* \end{bmatrix} \quad (10)$$

$$= \frac{1}{\sqrt{2}} \begin{bmatrix} h_1 & h_2 & 0 & 0 \\ -h_2^* & h_1^* & 0 & 0 \\ 0 & 0 & h_3 & h_4 \\ 0 & 0 & -h_4^* & h_3^* \end{bmatrix} \begin{bmatrix} r_1 \\ r_2 \\ r_3 \\ r_4 \end{bmatrix} + \begin{bmatrix} n_1 \\ n_2^* \\ n_3 \\ n_4^* \end{bmatrix}$$

$$= Hr + n \text{ In Equation (10),}$$

the y denotes a vector including signals received in the receiver at four time slots and conjugates of the received signals. If the receiver multiplies both sides of Equation (10) by a matrix $H^H$ and then detects modulated symbols, the modulated symbols are expressed as Equation (11) where the H represents a channel response matrix:

$$\hat{r} = H^H y \quad (11)$$

$$= \begin{bmatrix} \hat{r}_1 \\ \hat{r}_2 \\ \hat{r}_3 \\ \hat{r}_4 \end{bmatrix}$$

$$= \frac{1}{2} \begin{bmatrix} |h_1|^2 + |h_2|^2 & 0 & 0 & 0 \\ 0 & |h_1|^2 + |h_2|^2 & 0 & 0 \\ 0 & 0 & |h_3|^2 + |h_4|^2 & 0 \\ 0 & 0 & 0 & |h_3|^2 + |h_4|^2 \end{bmatrix}$$

$$\begin{bmatrix} r_1 \\ r_2 \\ r_3 \\ r_4 \end{bmatrix} + \begin{bmatrix} \hat{n}_1 \\ \hat{n}_2^* \\ \hat{n}_3 \\ \hat{n}_4^* \end{bmatrix}$$

It can be noted that, when the FDFR space time block coding scheme suggested by S. M. Alamouti is employed, it is unnecessary to employ the pre-encoder 400 described with reference to FIG. 4 because all symbols undergo two channels as shown in Equation (11).

The present invention employs a pre-encoder as described above and proposes a pre-encoding scheme for minimizing complexity and computation in decoding and encoding while providing the same performance as the conventional MIMO mobile communication system as compared with the conventional MIMO mobile communication system employing the space time block coding scheme suggested by S. M. Alamouti.

Hereinafter, description about an internal structure of the pre-encoder 500 of FIG. 5 will be given with reference to FIG. 6, which is a block diagram illustrating an internal structure of a pre-encoding matrix generator in the pre-encoder 500 of FIG. 5.

The pre-encoder 500 pre-encodes input modulated symbols by using a preset pre-encoding matrix. The present invention suggests a new pre-encoding matrix that minimizes complexity and the amount of computation while providing full diversity full rate. Although a pre-encoding matrix generator is independently constructed in the pre-encoder 500 in FIG. 6, it is expected that the pre-encoder 500 can perform pre-encoding with a pre-encoding matrix previously generated in the same manner as shown in FIG. 6.

Figure 6:
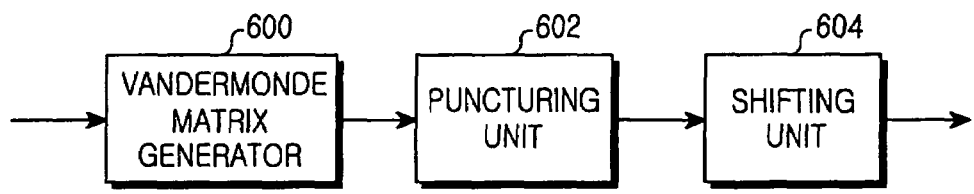
FIG. 6 is a block diagram illustrating an internal structure of a pre-encoding matrix generator in the pre-encoder FIG. 5.

Referring to FIG. 6, the pre-encoding matrix generator of the pre-encoder 500 includes a Vandermonde matrix generator 600, a puncturing unit 602, and a shifting unit 604. The Vandermonde matrix generator 600 generates a Vandermonde matrix corresponding to the number of transmit antennas (i.e., four transmit antennas) in the transmitter and then outputs the Vandermonde matrix to the puncturing unit 602.

The puncturing unit 602 receives the Vandermonde matrix generated by the Vandermonde matrix generator 600, performs puncturing with respect to two sequential columns (i.e., a third column and a fourth column) of the Vandermonde matrix and then outputs the punctured Vandermonde matrix to the shifting unit 604. Herein, the puncturing of the puncturing unit 602 is achieved by substituting zeros for element values of corresponding columns in the Vandermonde matrix.

The shifting unit 604 receives the punctured Vandermonde matrix output from the puncturing unit 602 and shifts even rows of the punctured Vandermonde matrix. The shifting has the effect of moving column elements in the same row. Although an example in which the shifting unit 604 receives the punctured Vandermonde matrix output from the puncturing unit 602 and shifts even rows of the punctured Vandermonde matrix is described with reference to FIG. 6, the same effect can be obtained when the shifting unit 604 shifts odd rows of the punctured Vandermonde matrix.

Hereinafter, the operation of the pre-encoding matrix generator will be summarized.

(1) Vandermonde Matrix Generation

A 4×4 Vandermonde matrix is generated.

$$\Theta = \begin{bmatrix} 1 & \alpha_0^1 & \alpha_0^2 & \alpha_0^3 \\ 1 & \alpha_1^1 & \alpha_1^2 & \alpha_1^3 \\ 1 & \alpha_2^1 & \alpha_2^2 & \alpha_2^3 \\ 1 & \alpha_3^1 & \alpha_3^2 & \alpha_3^3 \end{bmatrix}$$

(2) Puncturing for the Vandermonde Matrix

A $$4 \times \frac{4}{2}$$

sub-matrix of the generated 4×4 Vandermonde matrix is punctured.

$$\Theta = \begin{bmatrix} 1 & \alpha_0^1 & 0 & 0 \\ 1 & \alpha_1^1 & 0 & 0 \\ 1 & \alpha_2^1 & 0 & 0 \\ 1 & \alpha_3^1 & 0 & 0 \end{bmatrix}$$

(3) Shifting for Even Rows of the Punctured 4×4 Vandermonde Matrix

A pre-encoding matrix is generated by shifting even rows of the punctured 4×4 Vandermonde matrix.

$$\Theta = \begin{bmatrix} 1 & \alpha_0^1 & 0 & 0 \\ 0 & 0 & 1 & \alpha_1^1 \\ 1 & \alpha_2^1 & 0 & 0 \\ 0 & 0 & 1 & \alpha_3^1 \end{bmatrix}.$$

Herein, when $\alpha_0=\alpha_1$ and $\alpha_2=\alpha_3$, the same performance can be obtained.

When four transmit antennas are employed as described above, the pre-encoder 500 receives four input modulated symbols $d_1$, $d_2$, $d_3$, and $d_4$ (i.e., an input modulated symbol stream d) and performs pre-encoding as shown in Equation (12):

$$r = \Theta d = \begin{bmatrix} 1 & \alpha_0^1 & 0 & 0 \\ 0 & 0 & 1 & \alpha_0^1 \\ 1 & \alpha_1^1 & 0 & 0 \\ 0 & 0 & 1 & \alpha_1^1 \end{bmatrix} \begin{bmatrix} d_1 \\ d_2 \\ d_3 \\ d_4 \end{bmatrix} = \begin{bmatrix} r_1 \\ r_2 \\ r_3 \\ r_4 \end{bmatrix} \quad (12)$$

In Equation (12), $\alpha_0 = \exp^{-j\Theta_0}$, and $\alpha_1 = \exp^{-j\Theta_1}$. Equation (12) may be expressed as Equation (13):

$$r = \Theta d = \begin{bmatrix} 1 & \alpha_0^1 & 0 & 0 \\ 0 & 0 & 1 & \alpha_0^1 \\ 0 & 0 & 1 & \alpha_1^1 \\ 1 & \alpha_1^1 & 0 & 0 \end{bmatrix} \begin{bmatrix} d_1 \\ d_2 \\ d_3 \\ d_4 \end{bmatrix} = \begin{bmatrix} r_1 \\ r_2 \\ r_3 \\ r_4 \end{bmatrix} \quad (13)$$

In Equation (13), $\alpha_0 = \exp^{-j\Theta_0}$ and $\alpha_1 = \exp^{-j\Theta_1}$.

The mapper 502 receives pre-encoded symbols corresponding to the same pre-encoding matrix as described with reference to FIG. 6 from the pre-encoder 500, performs space-time mapping with respect to the pre-encoded symbols to transmit the symbols through the Alamouti scheme, and then outputs the symbols to the Alamouti encoders 506 and 508. In other words, the mapper 502 classifies the pre-encoded symbols into symbols to be transmitted through each of two transmit antenna groups with four transmit antennas (i.e., a first transmit antenna group including the first transmit antenna 510 and the second transmit antenna 512 and a second antenna group including the third transmit antenna 514 and the fourth transmit antenna 516) to transmit the symbols according to the Alamouti scheme. Herein, description about operations of the delay unit 504 and the Alamouti encoders 506 and 508 with be omitted because the delay unit 504 and the Alamouti encoders 506 and 508 perform the same operations as the delay unit 404 and the Alamouti encoders 406 and 408 described with reference to FIG. 4.

Figure 7:
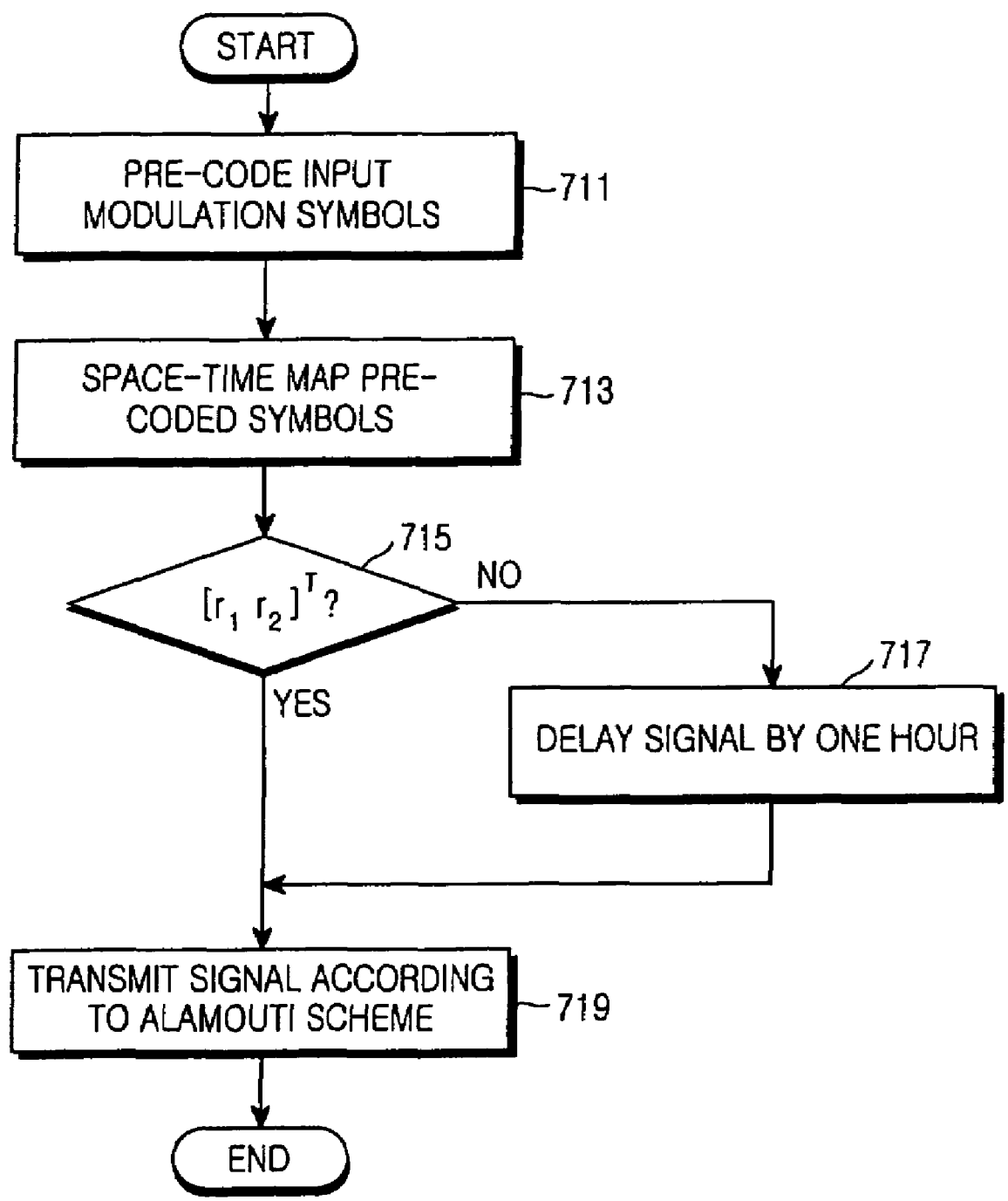
FIG. 7 is a flowchart illustrating a operation procedure of the transmitter of FIG. 5.

Hereinafter, description about an operation of the transmitter shown in FIG. 5 will be described with reference to FIG. 7, which is a flowchart illustrating the operation procedure of the transmitter.

In step 711, the transmitter pre-encodes an input modulated symbol stream d, by using the same pre-encoding matrix as described with reference to FIG. 6, $$\Theta = \begin{bmatrix} 1 & \alpha_0^1 & 0 & 0 \\ 0 & 0 & 1 & \alpha_1^1 \\ 1 & \alpha_2^1 & 0 & 0 \\ 0 & 0 & 1 & \alpha_3^1 \end{bmatrix}.$$

In step 713, the transmitter performs space-time mapping with respect to the pre-encoded symbols such that the pre-encoded symbols are transmitted through the first transmit antenna to the fourth transmit antenna.

In step 715, the transmitter determines if a signal having undergone the space-time mapping is a signal ($[r_1,r_2]^T$). If the signal having undergone the space-time mapping is not the signal ($[r_1,r_2]^T$) as the determination result (i.e., if the signal having undergone the space-time mapping is a signal ($[r_3,r_4]^T$)), the transmitter delays the signal having undergone the space-time mapping by one time duration in step 717. If the signal having undergone the space-time mapping is the signal ($[r_1,r_2]^T$) as the determination result in step 715, the transmitter controls the signal having undergone the space-time mapping corresponding to the Alamouti scheme (i.e., the space time block coding scheme suggested by S. M. Alamouti) to be transmitted through corresponding transmit antennas in step 719 and ends the operation procedure.

The operation procedure of the transmitter shown in FIG. 5 is described with reference to FIG. 7. Hereinafter, a structure of a receiver corresponding to the structure of the transmitter of FIG. 5 will be described with reference to FIG. 8, which is a block diagram illustrating the structure of the receiver corresponding to the transmitter of FIG. 5.

The receiver includes a plurality of receive antennas (e.g., P receive antennas (Rx. ANTs) including a first receive antenna (Rx. ANT 1) 800 to a $P^{th}$ receive antenna (Rx. ANT P) 804), a channel estimator 806, a channel response matrix generator 808, a signal combiner 810, and signal determination units 812 and 814. Although it is assumed that the number of receive antennas in the receiver is different from the number of the transmit antennas in the transmitter corresponding to the receiver in FIG. 8, it is expected that the number of the receive antennas may be identical to the number of the transmit antennas.

Signals transmitted through the four transmit antennas in the transmitter as described with reference to FIG. 5 are received the first receive antenna 800 to the $P^{th}$ receive antenna 804, respectively. The first receive antenna 800 to the $P^{th}$ receive antenna 804 output the received signals to the channel estimator 806 and the signal combiner 810.

The channel estimator 806 receives signals through each of the first receive antenna 800 to the $P^{th}$ receive antenna 804 and estimates channel coefficients representing channel gains. If one receive antenna is employed in the receiver, a signal received through one receive antenna may be expressed as Equation (14):

$$y = H\Theta d + n = \frac{1}{2} \begin{bmatrix} h_1 & h_1\alpha_0^1 & h_2 & h_2\alpha_0^1 \\ h_2^* & h_2^*\alpha_0^1 & -h_1^* & -h_1^*\alpha_0^1 \\ h_3 & h_3\alpha_1^1 & h_4 & h_4\alpha_1^1 \\ h_4^* & h_4^*\alpha_1^1 & -h_3^* & -h_3^*\alpha_1^1 \end{bmatrix} \begin{bmatrix} d_1 \\ d_2 \\ d_3 \\ d_4 \end{bmatrix} + \begin{bmatrix} n_1 \\ n_2^* \\ n_3 \\ n_4^* \end{bmatrix} \quad (14)$$

In Equation (14), the y denotes the signal received through the receive antenna, the H denotes a channel response matrix, and the n denotes noises.

The channel estimator 806 receives the signal shown in Equation (14) to perform channel estimation and then outputs channel coefficients to the channel response matrix generator 808. The channel response matrix generator 808 receives the channel coefficients output from the channel estimator 806, generates the channel response matrix shown in Equation (15), and then outputs the channel response matrix to the signal combiner 810 and the signal determination units 812 and 814.

$$H_{new} = \begin{bmatrix} h_1 & h_1\alpha_0^1 & h_2 & h_2\alpha_0^1 \\ h_2^* & h_2^*\alpha_0^1 & -h_1^* & -h_1^*\alpha_0^1 \\ h_3 & h_3\alpha_1^1 & h_4 & h_4\alpha_1^1 \\ h_4^* & h_4^*\alpha_1^1 & -h_3^* & -h_3^*\alpha_1^1 \end{bmatrix} \quad (15)$$

In Equation (15), the $H_{new}$ denotes the channel response matrix.

The signal combiner 810 receives signals from the first receive antenna 800 to the $P^{th}$ receive antenna 804 and the channel response matrix $H_{new}$ generated in the channel response matrix generator 808 to combine the signals to make receive symbols and then outputs the receive symbols to the signal determination units 812 and 814.

Each of the signal determination units 812 and 814 receives the channel response matrix $H_{new}$ output from the channel response matrix generator 808 and signals output from the signal combiner 810 and estimates and outputs input modulated symbols transmitted in the transmitter. Hereinafter, operations of the signal determination units 812 and 814 will be described.

The multiplication of the $H_{new}^H$ and the $H_{new}$ performed for estimating an input modulated symbol stream $d=[d_1, d_2, d_3, d_4]$ transmitted in the transmitter is expressed as Equation (16)

$$H_{new}^H \cdot H_{new} = \begin{bmatrix} A & B & 0 & 0 \\ B & A & 0 & 0 \\ 0 & 0 & A & B \\ 0 & 0 & B & A \end{bmatrix} \quad (16)$$

In Equation (16), the A is equal to $|h_1|^2+|h_2|^2+|h_3|^2+|h_1|^4$ and the B is equal to $|h_1|^2(\alpha_0^1)^*+|h_2|^2(\alpha_0^1)^*+|h_3|^2(\alpha_1^1)^*+|h_1|^4(\alpha_0^1)^*$. Accordingly, the multiplication of the $H_{new}^H$ and the received signal y may be expressed as Equation (17):

$$y' = \begin{bmatrix} y_1' \\ y_2'^* \\ y_3' \\ y_4'^* \end{bmatrix} = H_{new}^H y = \frac{1}{2}\begin{bmatrix} A & B & 0 & 0 \\ B & A & 0 & 0 \\ 0 & 0 & A & B \\ 0 & 0 & B & A \end{bmatrix}\begin{bmatrix} d_1 \\ d_2 \\ d_3 \\ d_4 \end{bmatrix} + H_{new}^H \begin{bmatrix} n_1 \\ n_2^* \\ n_3 \\ n_4^* \end{bmatrix} \quad (17)$$

The $d_1$ and the $d_2$ can be estimated based on the $y_1'$ and the $y_2'^*$ in the y' obtained after multiplying the $H_{new}^H$ by the received signal y as shown in Equation (17), and the $d_3$ and the $d_4$ can be estimated based on the $y_3'$ and $y_4'^*$ in the y. The input modulated symbols $d_1, d_2, d_3,$ and $d_4$ may be estimated as shown in Equation (18):

$$\tilde{d}_{1,2} = \arg \min_{d_{1,2}} \|y_{1,2}' - pd_{1,2}\|_2 \quad (18)$$

$$\tilde{d}_{3,4} = \arg \min_{d_{3,4}} \|y_{3,4}' - pd_{3,4}\|_2$$

In Equation (18), $$p = \begin{bmatrix} A & B \\ B^* & A \end{bmatrix}, \tilde{d}_{1,2} = \begin{bmatrix} \tilde{d}_1 \\ \tilde{d}_2 \end{bmatrix}, \tilde{d}_{3,4} = \begin{bmatrix} \tilde{d}_3 \\ \tilde{d}_4 \end{bmatrix}, d_{1,2} = \begin{bmatrix} d_1 \\ d_2 \end{bmatrix},$$

$$d_{3,4} = \begin{bmatrix} d_3 \\ d_4 \end{bmatrix}, y_{1,2} = \begin{bmatrix} y_1' \\ y_2'^* \end{bmatrix}, \text{and } y_{3,4} = \begin{bmatrix} y_3' \\ y_4'^* \end{bmatrix}.$$

Therefore, it is possible to estimate the input modulated symbols $d_1, d_2, d_3, d_4$ by classifying the input modulated symbols into $d_1, d_2$ and $d_3, d_4$.

Each of the signal determination units 812 and 814 estimates signals as shown in Equation (18). The signal determination unit 812 determines and outputs estimation symbols $\tilde{d}_1$ and $\tilde{d}_2$ for the input signals $d_1$, and $d_2$, and the signal determination unit 814 determines and outputs estimation symbols $\tilde{d}_3$ and $\tilde{d}_4$ for the input signals $d_3$ and $d_4$.

Figure 8:
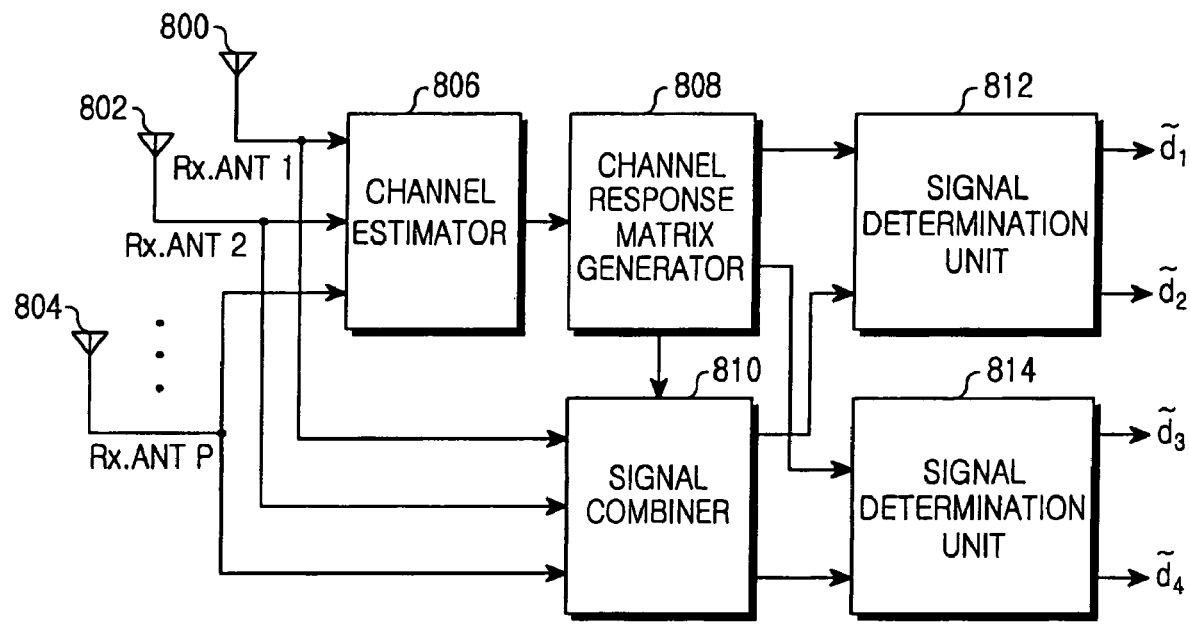
FIG. 8 is a block diagram illustrating a structure of a receiver corresponding to the structure of the transmitter of FIG. 5.
Figure 9:
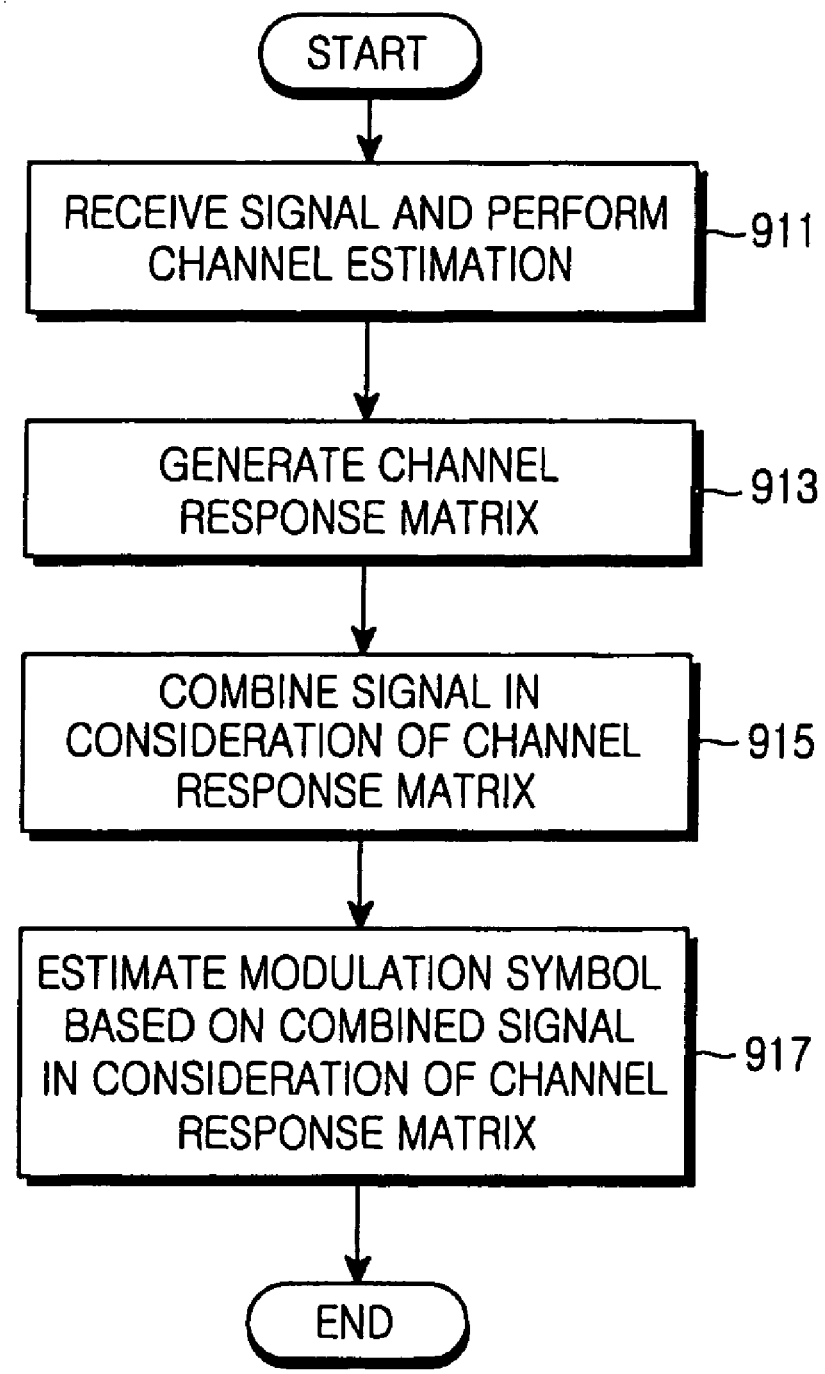
FIG. 9 is a flowchart illustrating an operation procedure of the receiver of FIG. 8.

Hereinafter, an operation of the receiver shown in FIG. 8 will be described with reference to FIG. 9, which is a flowchart illustrating the operation procedure of the receiver of FIG. 8.

In step 911, the receiver receives signals through the P receive antennas and estimates channel gains by performing channel estimation. In step 913, the transmitter generates a channel response matrix $H_{new}$ in consideration of the estimated channel gains. In step 915, the receiver combines the signals received through the P receive antennas in consideration of the generated channel response matrix $H_{new}$. In step 917, the receiver estimates modulated symbols transmitted in the transmitter based on the combined signals in consideration of the channel response matrix $H_{new}$ and outputs estimations symbols $\tilde{d}_1, \tilde{d}_2, \tilde{d}_3, \tilde{d}_4$.

As compared with a case of employing the Vandermonde matrix as a pre-encoding matrix, the pre-encoding matrix according to an embodiment of the present invention described above reduces complexity from ML decoding of size 4 to ML decoding of size-2, thereby minimizing the amount of computation needed. However, a size-2 precoder should be optimized in order to maximize a coding gain. Herein, optimization of the size-2 pre-encoder for maximizing the coding gain can be achieved through simulation. The simulation can be realized through a number theory or a computer search.

Hereinafter, description about a coding gain when $\theta_0$ and $\theta_1$ are changed by single degrees within the range of 0 to 360 degrees with respect to $\alpha_0=\exp^{-j\theta_0}$ and $\alpha_1=\exp^{-j\theta_1}$ $1(0\leq\theta_0, \theta_1\leq 2\pi)$ of the pre-encoding matrix will be described with reference to FIG. 10.

Figure 10:
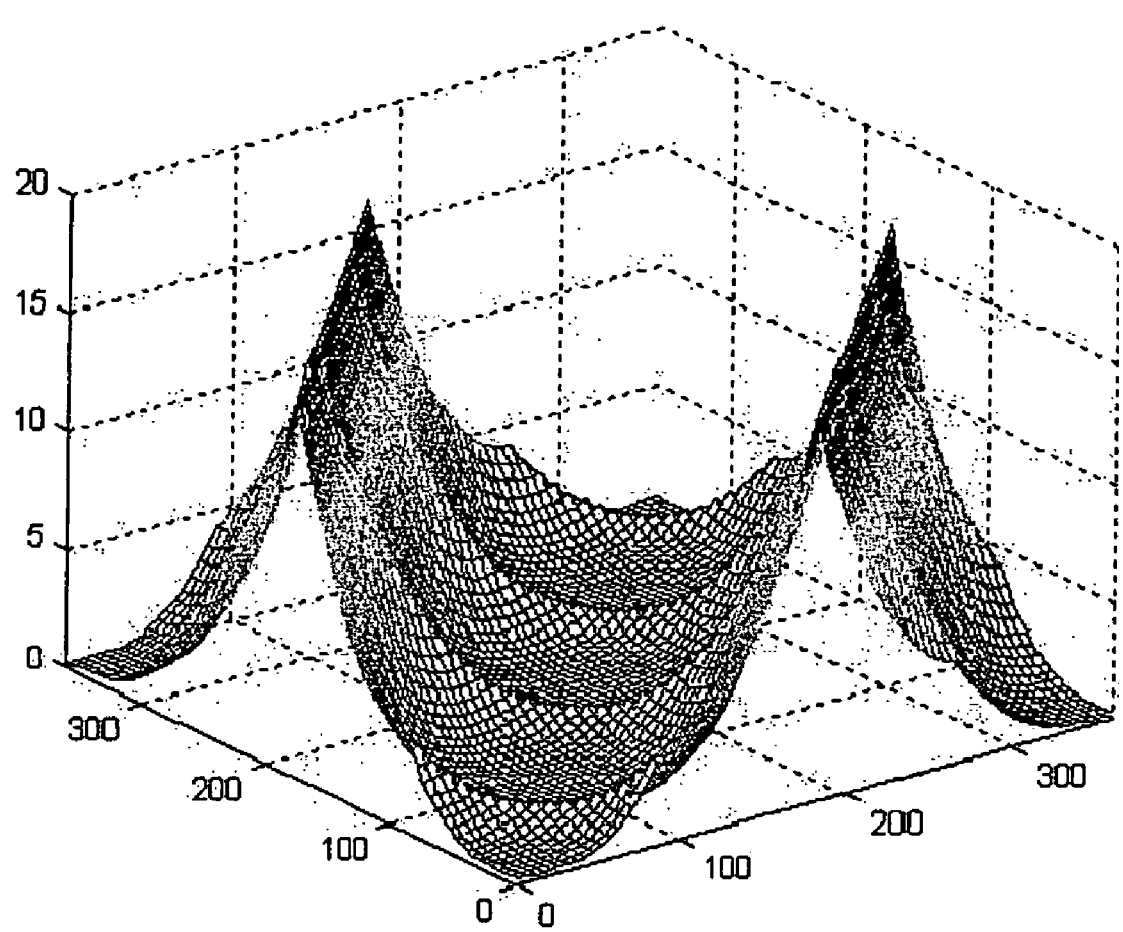
FIG. 10 is a graph illustrating a simulation result of a coding gain when $\theta_0$ and $\theta_1$ are changed by single degrees within the range of 0 degree to 360 degrees with respect to $\alpha_0 = \exp^{-j\theta_0}$ and $\alpha_1 = \exp^{-j\theta_0}$ ($0 \leq \theta_0, \theta_1 \leq 2\pi$) of a pre-encoding matrix according to an embodiment of the present invention.

FIG. 10 is a graph illustrating a simulation result for the coding gain when $\theta_0$ and $\theta_1$ are changed by single degrees within the range of 0 to 360 degrees with respect to $\alpha_0=\exp^{j\theta_0}$ and $\alpha_1=\exp^{-j\theta_1}$ $(0\leq\theta_0, \theta_1\leq 2\pi)$ of the pre-encoding matrix according to an embodiment of the present invention.

Referring to FIG. 10, an x axis, a y axis, and a z axis represent the $\theta_0$, the $\theta_1$, and the coding gain, respectively. Herein, the largest coding gain can be obtained in $\theta_0$ and $\theta_1$ corresponding to the maximum value of the z axis. Accordingly, a condition in Equation (19) should be satisfied to maximize the coding gain as shown in FIG. 10.

$$|\theta_1 - \theta_0| = 180n \quad (19)$$

In Equation 19, n denotes an any integer. Therefore, it can be noted that the same performance can be obtained with respect to all values of the $\theta_0$ and the $\theta_1$ satisfying the condition of Equation (19). Accordingly, it can be noted that there are numerous types of space time block codes based on the pre-encoding matrix according to an embodiment of the present invention.

Hereinafter, the performance for a space time block coding scheme according to an embodiment of the present invention will be compared with the performance for typical space time block coding schemes with reference to FIG. 11.

Figure 11:
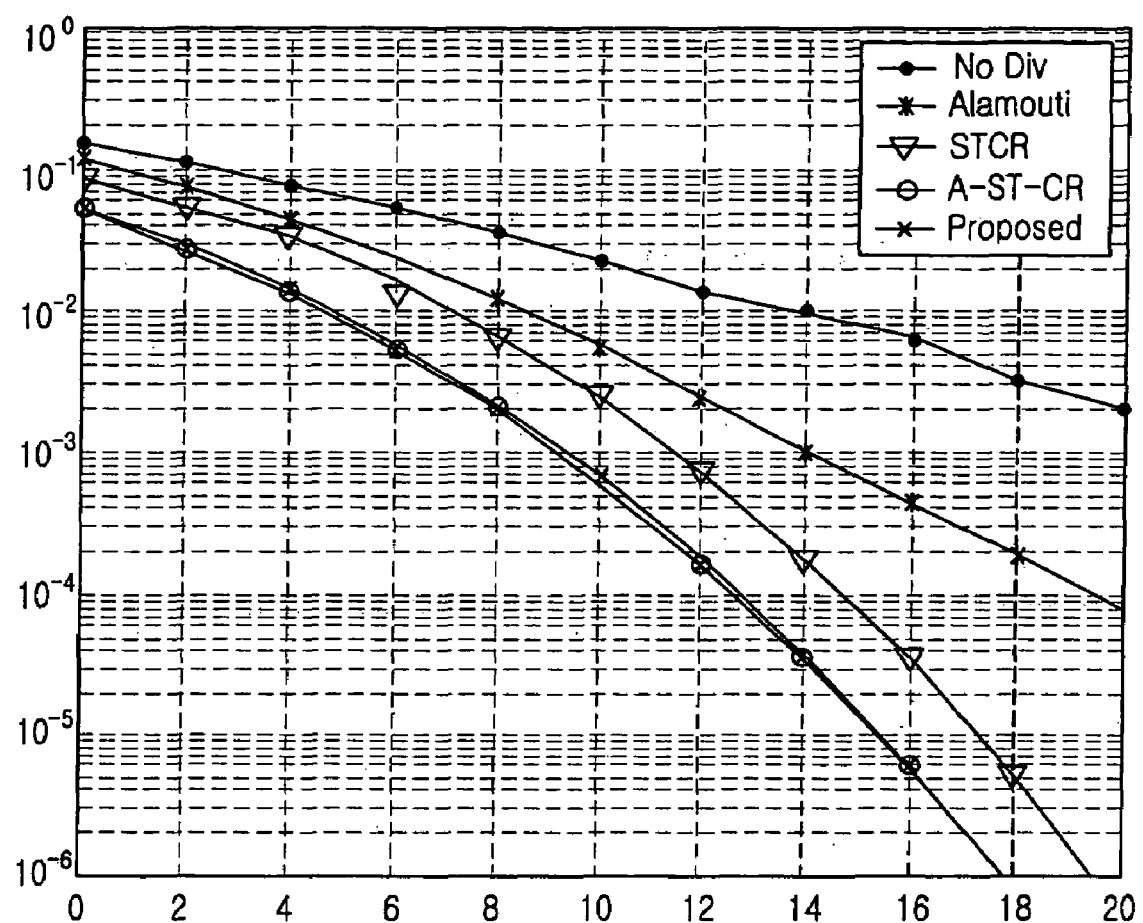
FIG. 11 is a graph illustrating performance for an STBC scheme according to an embodiment of the present invention, and performance for typical STBC schemes.

FIG. 11 is a graph illustrating the performance for the space time block coding scheme according to an embodiment of the present invention and the performance for the typical space time block coding schemes.

FIG. 11 illustrates performance curves of the space time block coding scheme according to an embodiment of the present invention, the space time block coding scheme suggested by S. M. Alamouti, and the space time block coding scheme suggested by the Tae Jin Jeong and Gyung Hoon Jeon research team (A-ST-CR). In addition, FIG. 11 illustrates a performance curve in a case in which a space time block coding scheme is not employed (No Div).

The performance curves shown in FIG. 11 represent curves in a case of employing the QPSK as a modulation scheme. In FIG. 11, the x axis indicates a signal to noise ratio (SNR), and the y axis indicates a bit error rate (BER).

Hereinafter, complexity of the space time block coding scheme according to an embodiment of the present invention will be described in comparison with complexity of the typical space time block coding schemes.

First, it is assumed that a complex signal of $2^m$ is employed. A pre-encoder suggested by the Tae Jin Jeong and Gyung Hoon Jeon research team has decoding complexity of $(2^m)^4$. The pre-encoder according to an embodiment of the present invention has decoding complexity of $2 \times (2^m)^2$. Accordingly, it can be noted that the pre-encoder of the present invention remarkably reduces decoding complexity as compared with the pre-encoder suggested by the Tae Jin Jeong and Gyung Hoon Jeon research team.

For example, on the assumption that the 16QAM is employed as a modulation scheme in the transmitter, the pre-encoder suggested by the Tae Jin Jeong and Gyung Hoon Jeon research team has decoding complexity of $C_{old} = (2^4)^4 = 2^{16}$, and the pre-encoder according to the present invention has decoding complexity of $C_{new} = (2^4)^2 = 2^8$. Accordingly, it can be noted that the computation amount of the pre-encoder according to the present invention is remarkably reduced because $$\frac{C_{old}}{C_{new}} = 0.0039.$$

As a result, as shown in FIG. 11, it can be noted that the space time block coding scheme of the present invention minimizes complexity and a computation amount even when it has performance similar to that of the space time block coding scheme suggested by the Tae Jin Jeong and Gyung Hoon Jeon research team. Although only a MIMO mobile communication system employing four transmit antennas is described by way of example in the present invention, it is natural that the space time block coding scheme of the present invention can be applied to a MIMO mobile communication system employing even number of transmit antennas.

As described above, the present invention suggests a pre-encoding matrix, thereby enabling the acquisition of full diversity full rate while minimizing complexity and the amount of computation in a MIMO mobile communication system.

While the invention has been shown and described with reference to certain preferred embodiments thereof, it will be understood by those skilled in the art that various changes in form and details may be made therein without departing from the spirit and scope of the invention. Consequently, the scope of the invention should not be limited to the embodiments, but should be defined by the appended claims and equivalents thereof.

What is claimed is:

1. A method for encoding a space time block code in a transmitter employing a plurality of transmit antennas, the method comprising the steps of:
    if a signal to be transmitted is input, pre-encoding the transmit signal according to a preset pre-encoding matrix;
    space-time mapping the pre-encoded signal according to a number of transmit antennas to employ a preset space time block coding scheme; and
    transmitting the space-time mapped signal through the transmit antennas by applying the preset space time block coding scheme to the space-time mapped signal,
    wherein the pre-encoded signal is divided according to a plurality of transmit antenna groups into which the transmit antennas are classified, and
    wherein the preset pre-encoding matrix is generated by:
        generating a Vandermonde matrix corresponding to the number of transmit antennas,
        puncturing selected sequential columns of the Vandermonde matrix, and
        shifting predetermined rows of the punctured Vandermonde matrix.

2. The method as claimed in claim 1, wherein, if the number of transmit antennas is four, the pre-encoding matrix is expressed as $$\Theta = \begin{bmatrix} 1 & \alpha_0^1 & 0 & 0 \\ 0 & 0 & 1 & \alpha_0^1 \\ 1 & \alpha_1^1 & 0 & 0 \\ 0 & 0 & 1 & \alpha_1^1 \end{bmatrix}, \text{ or, } \Theta = \begin{bmatrix} 1 & \alpha_0^1 & 0 & 0 \\ 0 & 0 & 1 & \alpha_0^1 \\ 0 & 0 & 1 & \alpha_1^1 \\ 1 & \alpha_1^1 & 0 & 0 \end{bmatrix},$$

wherein the $\Theta$ denotes the pre-encoding matrix, $\alpha_0 = \exp^{-j\theta_0}$, and $\alpha_1 = \exp^{-j\theta_0}$.

3. The method as claimed in claim 1, wherein, if the number of transmit antennas is four, the pre-encoding matrix is expressed as $$\Theta = \begin{bmatrix} 1 & \alpha_0^1 & 0 & 0 \\ 0 & 0 & 1 & \alpha_0^1 \\ 1 & \alpha_1^1 & 0 & 0 \\ 0 & 0 & 1 & \alpha_1^1 \end{bmatrix}, \text{ or, } \Theta = \begin{bmatrix} 1 & \alpha_0^1 & 0 & 0 \\ 0 & 0 & 1 & \alpha_0^1 \\ 0 & 0 & 1 & \alpha_1^1 \\ 1 & \alpha_1^1 & 0 & 0 \end{bmatrix},$$

wherein the $\Theta$ denotes the pre-encoding matrix, $\alpha_0 = \exp^{-j\theta_0}$, $\alpha_1 = \exp^{-j\theta_1}$, and $|\theta_1 - \theta_0| = 180n$, wherein the n denotes an any integer.

4. The method as claimed in claim 1 further comprising the steps of:

if an input symbol stream '$d_1\ d_2\ d_3\ d_4$' to be transmitted is input, pre-encoding the input symbol stream '$d_1\ d_2\ d_3\ d_4$' according to a preset pre-encoding matrix to generate a pre-encoded symbol stream '$r_1\ r_2\ r_3\ r_4$';

space-time mapping the pre-encoded symbol stream '$r_1\ r_2\ r_3\ r_4$' to employ a preset space time block coding scheme to generate space-time mapped symbol streams '$r_1\ r_2$' and '$r_3\ r_4$'; and transmitting the space-time mapped symbol streams '$r_1\ r_2$' and '$r_3\ r_4$' through the transmit antennas by applying the preset space time block coding scheme to space-time mapped symbol streams '$r_1\ r_2$' and '$r_3\ r_4$'.

5. The method as claimed in claim 4, wherein, in the step of the space-time mapping, the pre-encoded symbol stream '$r_1\ r_2\ r_3\ r_4$' is divided into a symbol stream '$r_1\ r_2$' to be transmitted through the first transmit antenna and the second transmit antenna and a symbol stream '$r_3\ r_4$' to be transmitted through the third transmit antenna and the fourth transmit antenna.

6. The method as claimed in claim 5, wherein the step of pre-encoding the input symbol stream '$d_1\ d_2\ d_3\ d_4$' is expressed by $$r = \Theta d = \begin{bmatrix} 1 & \alpha_0^1 & 0 & 0 \\ 0 & 0 & 1 & \alpha_0^1 \\ 1 & \alpha_1^1 & 0 & 0 \\ 0 & 0 & 1 & \alpha_1^1 \end{bmatrix} \begin{bmatrix} d_1 \\ d_2 \\ d_3 \\ d_4 \end{bmatrix} = \begin{bmatrix} r_1 \\ r_2 \\ r_3 \\ r_4 \end{bmatrix}, \text{ or,}$$

$$r = \Theta d = \begin{bmatrix} 1 & \alpha_0^1 & 0 & 0 \\ 0 & 0 & 1 & \alpha_0^1 \\ 0 & 0 & 1 & \alpha_1^1 \\ 1 & \alpha_1^1 & 0 & 0 \end{bmatrix} \begin{bmatrix} d_1 \\ d_2 \\ d_3 \\ d_4 \end{bmatrix} = \begin{bmatrix} r_1 \\ r_2 \\ r_3 \\ r_4 \end{bmatrix},$$

wherein the $\Theta$ denotes the pre-encoding matrix, $\alpha_0 = \exp^{-j\theta_0}$, and $\alpha = \exp^{-j\theta_1}$.

7. The method as claimed in claim 6, wherein, in the step of transmitting the space-time mapped symbol streams '$r_1\ r_2$' and '$r_3\ r_4$' through the first and the second transmit antennas and the third and the fourth transmit antennas, respectively, by applying the space time block coding scheme to the space-time mapped symbol streams '$r_1\ r_2$' and '$r_3\ r_4$', the symbol $r_1$ and the symbol $r_2$ are transmitted through the first transmit antenna and the second transmit antenna at a predetermined first time slot, a symbol $-r_2^*$ and a symbol $r_1^*$ are transmitted through the first transmit antenna and the second transmit antenna at a second time slot sequential to the first time slot, a symbol $r_3^*$ and a symbol $r_4^*$ are transmitted through the third transmit antenna and the fourth transmit antenna at a third time slot sequential to the second time slot, and a symbol $-r_4^*$ and a symbol $r_3^*$ are transmitted through the third transmit antenna and the fourth transmit antenna at a fourth time slot sequential to the third time slot, and wherein "*" denotes a conjugate operation.

8. The method as claimed in claim 5, wherein the step of pre-encoding the input symbol stream '$d_1\ d_2\ d_3\ d_4$' is expressed by, $$r = \Theta d = \begin{bmatrix} 1 & \alpha_0^1 & 0 & 0 \\ 0 & 0 & 1 & \alpha_0^1 \\ 1 & \alpha_1^1 & 0 & 0 \\ 0 & 0 & 1 & \alpha_1^1 \end{bmatrix} \begin{bmatrix} d_1 \\ d_2 \\ d_3 \\ d_4 \end{bmatrix} = \begin{bmatrix} r_1 \\ r_2 \\ r_3 \\ r_4 \end{bmatrix}, \text{ or,}$$

$$r = \Theta d = \begin{bmatrix} 1 & \alpha_0^1 & 0 & 0 \\ 0 & 0 & 1 & \alpha_0^1 \\ 0 & 0 & 1 & \alpha_1^1 \\ 1 & \alpha_1^1 & 0 & 0 \end{bmatrix} \begin{bmatrix} d_1 \\ d_2 \\ d_3 \\ d_4 \end{bmatrix} = \begin{bmatrix} r_1 \\ r_2 \\ r_3 \\ r_4 \end{bmatrix},$$

wherein the $\Theta$ denotes the pre-encoding matrix, the d denotes the input symbol stream '$d_1\ d_2\ d_3\ d_4$', the r denotes the pre-encoded symbol stream '$r_1\ r_2\ r_3\ r_4$', $\alpha_0 = \exp^{-j\theta_0}$, $\alpha_1 = \exp^{-j\theta_1}$, and $|\theta_1 - \theta_0| = 180n$, wherein the n denotes an any integer.

9. The method as claimed in claim 8, wherein, in the step of transmitting the space-time mapped symbol streams '$r_1\ r_2$' and '$r_3\ r_4$' through the first and the second transmit antennas and the third and the fourth transmit antennas, respectively, by applying the space time block coding scheme to the space-time mapped symbol streams '$r_1\ r_2$' and '$r_3\ r_4$', the symbol $r_1$ and the symbol $r_2$ are transmitted through the first transmit antenna and the second transmit antenna at a predetermined first time slot, a symbol $-r_2^*$ and a symbol $r_1^*$ are transmitted through the first transmit antenna and the second transmit antenna at a second time slot sequential to the first time slot, a symbol $r_3^*$ and a symbol $r_4^*$ are transmitted through the third transmit antenna and the fourth transmit antenna at a third time slot sequential to the second time slot, and a symbol $-r_4^*$ and a symbol $r_3^*$ are transmitted through the third transmit antenna and the fourth transmit antenna at a fourth time slot sequential to the third time slot, and wherein "*" denotes a conjugate operation.

10. An apparatus for encoding a space time block code in a transmitter employing a plurality of transmit antennas, the apparatus comprising:

a pre-encoder for, if a signal to be transmitted is input, pre-encoding the transmit signal according to a preset pre-encoding matrix;

a space-time mapper for space-time mapping the pre-encoded signal according to a number of transmit antennas to employ a preset space time block coding scheme; and a plurality of encoders for transmitting the space-time mapped signal through the transmit antennas by applying the preset space time block coding scheme to the space-time mapped signal, wherein the pre-encoded signal is divided according to a plurality of transmit antenna groups into which the transmit antennas are classified, and wherein the pre-encoder generates the preset pre-encoding matrix by generating a Vandermonde matrix corresponding to the number of transmit antennas, puncturing selected sequential columns of the Vandermonde matrix, and shifting predetermined rows of the punctured Vandermonde matrix.

11. The apparatus as claimed in claim 10, wherein, if the number of transmit antennas is four, the pre-encoding matrix is expressed as, $$\Theta = \begin{bmatrix} 1 & \alpha_0^1 & 0 & 0 \\ 0 & 0 & 1 & \alpha_0^1 \\ 1 & \alpha_1^1 & 0 & 0 \\ 0 & 0 & 1 & \alpha_1^1 \end{bmatrix}, \text{ or, } \Theta = \begin{bmatrix} 1 & \alpha_0^1 & 0 & 0 \\ 0 & 0 & 1 & \alpha_0^1 \\ 0 & 0 & 1 & \alpha_1^1 \\ 1 & \alpha_1^1 & 0 & 0 \end{bmatrix},$$

wherein the Θ denotes the pre-encoding matrix, $\alpha_0 = \exp^{-j\theta_0}$, and $\alpha_1 = \exp^{-j\theta_1}$.

12. The apparatus as claimed in claim 10, wherein, if the number of transmit antennas is four, the pre-encoding matrix is expressed as, $$\Theta = \begin{bmatrix} 1 & \alpha_0^1 & 0 & 0 \\ 0 & 0 & 1 & \alpha_0^1 \\ 1 & \alpha_1^1 & 0 & 0 \\ 0 & 0 & 1 & \alpha_1^1 \end{bmatrix}, \text{ or, } \Theta = \begin{bmatrix} 1 & \alpha_0^1 & 0 & 0 \\ 0 & 0 & 1 & \alpha_0^1 \\ 0 & 0 & 1 & \alpha_1^1 \\ 1 & \alpha_1^1 & 0 & 0 \end{bmatrix},$$

wherein the Θ denotes the pre-encoding matrix, $\alpha_0 = \exp^{-j\theta_0}$, $\alpha_1 = \exp^{-j\theta_1}$, and $|\theta_1 - \theta_0| = 180n$, wherein the n denotes an any integer.

13. The apparatus as claimed in claim 10, wherein the pre-encoder, if a symbol stream '$d_1\ d_2\ d_3\ d_4$' to be transmitted is input, pre-encodes the input symbol stream '$d_1\ d_2\ d_3\ d_4$' according to a preset pre-encoding matrix so as to generate a pre-encoded symbol stream '$r_1\ r_2\ r_3\ r_4$', the space time mapper space-time maps the pre-encoded symbol stream '$r_1\ r_2\ r_3\ r_4$' to-employ a preset space time block coding scheme to generate space-time mapped symbol streams '$r_1\ r_2$' and '$r_3\ r_4$', and two of the plurality of encoders transmit the space-time mapped symbol streams '$r_1\ r_2$' and '$r_3\ r_4$' through the transmit antennas by applying the preset space time block coding scheme to the space-time mapped symbol streams '$r_1\ r_2$' and '$r_3\ r_4$'.

14. The apparatus as claimed in claim 13, wherein the mapper divides the pre-encoded symbol stream '$r_1\ r_2\ r_3\ r_4$' into signals '$r_1\ r_2$' to be transmitted through the first transmit antenna and the second transmit antenna and signals '$r_3\ r_4$' to be transmitted through the third transmit antenna and the fourth transmit antenna.

15. The apparatus as claimed in claim 14, wherein the pre-encoder generates the pre-encoded symbol stream '$r_1\ r_2\ r_3\ r_4$' by pre-encoding the input symbol stream '$d_1\ d_2\ d_3\ d_4$' as, $$r = \Theta d = \begin{bmatrix} 1 & \alpha_0^1 & 0 & 0 \\ 0 & 0 & 1 & \alpha_0^1 \\ 1 & \alpha_1^1 & 0 & 0 \\ 0 & 0 & 1 & \alpha_1^1 \end{bmatrix} \begin{bmatrix} d_1 \\ d_2 \\ d_3 \\ d_4 \end{bmatrix} = \begin{bmatrix} r_1 \\ r_2 \\ r_3 \\ r_4 \end{bmatrix}, \text{ or,}$$

$$r = \Theta d = \begin{bmatrix} 1 & \alpha_0^1 & 0 & 0 \\ 0 & 0 & 1 & \alpha_0^1 \\ 0 & 0 & 1 & \alpha_1^1 \\ 1 & \alpha_1^1 & 0 & 0 \end{bmatrix} \begin{bmatrix} d_1 \\ d_2 \\ d_3 \\ d_4 \end{bmatrix} = \begin{bmatrix} r_1 \\ r_2 \\ r_3 \\ r_4 \end{bmatrix},$$

wherein the Θ denotes the pre-encoding matrix, $\alpha_0 = \exp^{-j\theta_0}$, and $\alpha_1 = \exp^{-j\theta_1}$.

16. The apparatus as claimed in claim 15, wherein the two encoders includes a first encoder and a second encoder, the first encoder transmitting the symbols $r_1$ and $r_2$ through the first transmit antenna and the second transmit antenna at a predetermined first time slot and symbols $-r_2^*$ and $r_1^*$ through the first transmit antenna and the second transmit antenna at a second time slot sequential to the first time slot, the second encoder transmitting symbols $r_3^*$ and $r_4^*$ through the third transmit antenna and the fourth transmit antenna at a third time slot sequential to the second time slot and symbols $-r_4^*$ and $r_3^*$ through the third transmit antenna and the fourth transmit antenna at a fourth time slot sequential to the third time slot, and wherein "*" denotes a conjugate operation.

17. The apparatus as claimed in claim 14, wherein the pre-encoder generates the pre-encoded symbol stream '$r_1\ r_2\ r_3\ r_4$' by pre-encoding the input symbol stream '$d_1\ d_2\ d_3\ d_4$' as, $$r = \Theta d = \begin{bmatrix} 1 & \alpha_0^1 & 0 & 0 \\ 0 & 0 & 1 & \alpha_0^1 \\ 1 & \alpha_1^1 & 0 & 0 \\ 0 & 0 & 1 & \alpha_1^1 \end{bmatrix} \begin{bmatrix} d_1 \\ d_2 \\ d_3 \\ d_4 \end{bmatrix} = \begin{bmatrix} r_1 \\ r_2 \\ r_3 \\ r_4 \end{bmatrix}, \text{ or,}$$

$$r = \Theta d = \begin{bmatrix} 1 & \alpha_0^1 & 0 & 0 \\ 0 & 0 & 1 & \alpha_0^1 \\ 0 & 0 & 1 & \alpha_1^1 \\ 1 & \alpha_1^1 & 0 & 0 \end{bmatrix} \begin{bmatrix} d_1 \\ d_2 \\ d_3 \\ d_4 \end{bmatrix} = \begin{bmatrix} r_1 \\ r_2 \\ r_3 \\ r_4 \end{bmatrix},$$

wherein the Θ denotes the pre-encoding matrix, the d denotes the input symbol stream '$d_1\ d_2\ d_3\ d_4$', the r denotes the pre-encoded symbol stream '$r_1\ r_2\ r_3\ r_4$', $\alpha_0 = \exp^{-j\theta_0}$, $\alpha_1 = \exp^{-j\theta_1}$, and $|\theta_1 - \theta_1| = 180n$, wherein the n denotes an any integer.

18. The apparatus as claimed in claim 17, wherein the two encoders includes a first encoder and a second encoder, the first encoder transmitting the symbols $r_1$ and $r_2$ through the first transmit antenna and the second transmit antenna at a predetermined first time slot and symbols $-r_2^*$ and $r_1^*$ through the first transmit antenna and the second transmit antenna at a second time slot sequential to the first time slot, the second encoder transmitting symbols $r_3^*$ and $r_4^*$ through the third transmit antenna and the fourth transmit antenna at a third time slot sequential to the second time slot and symbols $-r_4^*$ and $r_3^*$ through the third transmit antenna and the fourth transmit antenna at a fourth time slot sequential to the third time slot, and wherein "*" denotes a conjugate operation.

\* \* \* \* \*

UNITED STATES PATENT AND TRADEMARK OFFICE
CERTIFICATE OF CORRECTION

PATENT NO. : 7,620,117 B2  Page 1 of 1
APPLICATION NO. : 11/124888
DATED : November 17, 2009
INVENTOR(S) : Chae et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1227 days.

Signed and Sealed this

Twenty-sixth Day of October, 2010

David J. Kappos
*Director of the United States Patent and Trademark Office*